US006250145B1

United States Patent
Honold et al.

(10) Patent No.: US 6,250,145 B1
(45) Date of Patent: Jun. 26, 2001

(54) METHOD OF OPERATIONALLY TESTING AN EXHAUST GAS TURBOCHARGER HAVING A VARIABLE TURBINE GEOMETRY

(75) Inventors: Martin Honold, Metzingen; Erwin Schmidt, Baltmannsweiler; Siegfried Sumser, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/377,689

(22) Filed: Aug. 20, 1999

(30) Foreign Application Priority Data

Aug. 20, 1998 (DE) .............................. 198 37 834

(51) Int. Cl.$^7$ .................................. G01M 15/00
(52) U.S. Cl. ...................... 73/119 R; 73/117.3
(58) Field of Search .............. 73/112, 116, 117.2, 73/117.3, 117.4, 118.1, 118.2, 119 R; 340/438

(56) References Cited

U.S. PATENT DOCUMENTS

| | | | |
|---|---|---|---|
| 4,953,110 | * | 8/1990 | Chartrand . |
| 5,191,789 | * | 3/1993 | Furuya ................................ 73/118.2 |
| 5,377,112 | * | 12/1994 | Brown, Jr. et al. ................ 73/117.3 |
| 5,913,239 | * | 6/1999 | Morris, Jr. et al. ................ 73/117.3 |

FOREIGN PATENT DOCUMENTS

| | | |
|---|---|---|
| 23 14 576 | 10/1973 | (DE) . |
| 27 09 667 | 9/1978 | (DE) . |
| 195 31 871 | 11/1996 | (DE) . |
| 195 43 190 | 5/1997 | (DE) . |

OTHER PUBLICATIONS

*Unterwegshilfe Kfz–Elektrik* entitled "Funktionsweise, Stoörungsermittlung und –beseitigung" by Siegfried Schade et al., pp. 64–65, 1977.

* cited by examiner

*Primary Examiner*—Eric S. McCall
(74) *Attorney, Agent, or Firm*—Evenson, McKeown, Edwards & Lenahan, P.L.L.C.

(57) ABSTRACT

In the case of a method for operationally testing an exhaust gas turbocharger with a variable turbine geometry, actual values are detected of operating quantities which influence the operational capability of the exhaust gas turbocharger and which comprise main quantities which are used for deciding whether a fault exists in the exhaust gas turbocharger, as well as auxiliary quantities which describe a component of the exhaust gas turbocharger and are used for identifying faults in this component. In a first step, for fault detection, a quantity is measured as the main quantity which determines the engine air supply. In a second step, at least one auxiliary quantity is measured for the fault identification and, in the event of an unacceptable deviation of the actual auxiliary quantity value from the desired auxiliary quantity value, a fault signal is generated.

19 Claims, 1 Drawing Sheet

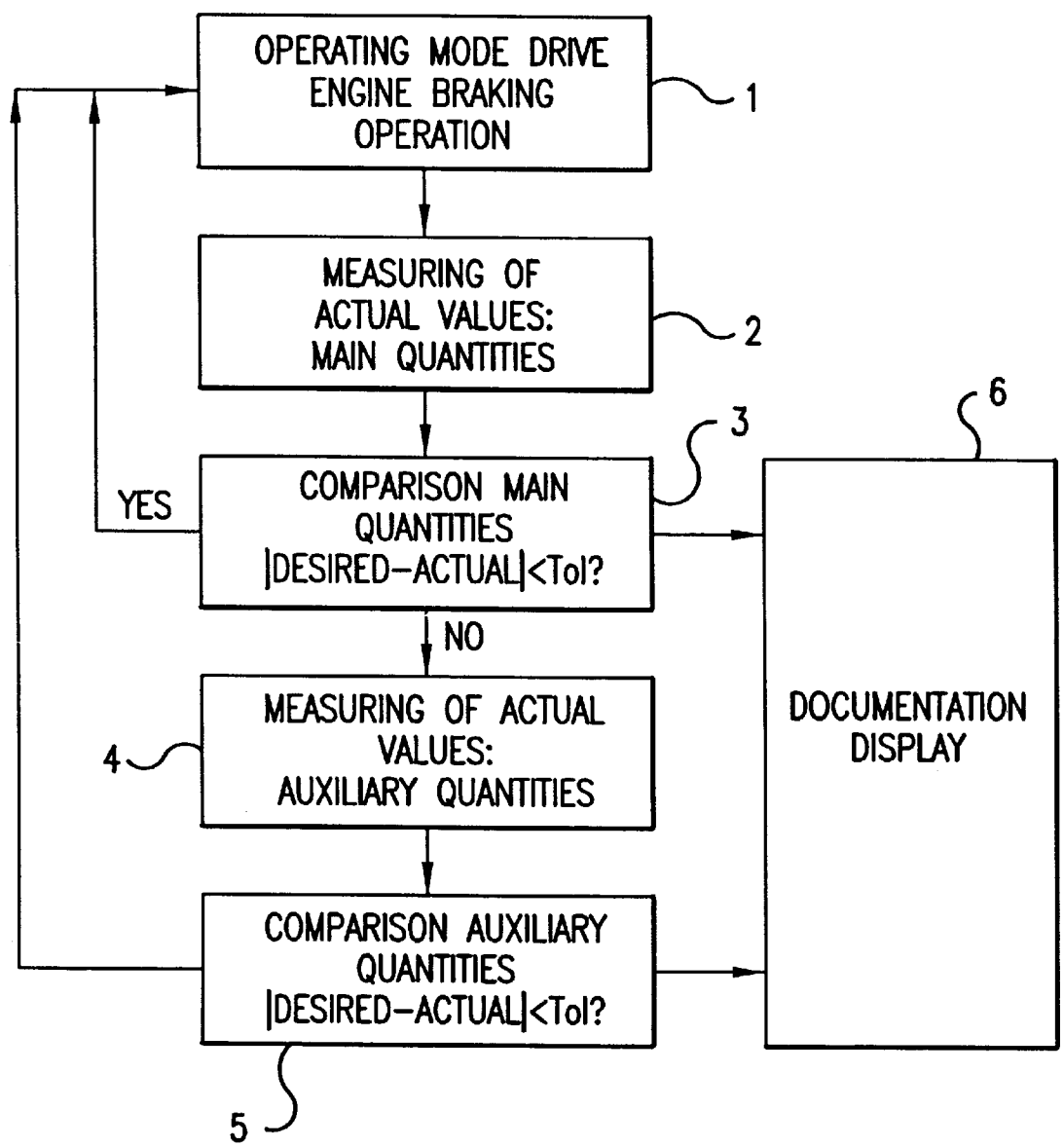

METHOD OF OPERATIONALLY TESTING AN EXHAUST GAS TURBOCHARGER HAVING A VARIABLE TURBINE GEOMETRY

BACKGROUND AND SUMMARY OF THE INVENTION

This application claims the priority of German Application No. 198 37 834.4, filed Aug. 20, 1998, the disclosure of which is expressly incorporated by reference herein.

The invention relates to a method for operationally testing an exhaust gas turbocharger with a variable turbine geometry.

From German Patent document DE 195 43 190 A1, an engine braking system is known for a supercharged internal-combustion engine. The engine has a turbine with a turbine geometry which can be variably adjusted by way of adjustable guide baffles. The guide baffles comprise guide blades, which can be adjusted by means of a control element such that the effective turbine cross-section of the turbine is changed. As a result, it is possible, according to the operating condition of the internal-combustion engine, to implement pressures of different intensities in the section between the cylinders and the exhaust gas turbocharger, whereby the output of the turbine and the output of the compressor can be adjusted according to the requirements.

In order to achieve an engine braking effect in the braking operation of the internal-combustion engine, the guide baffles are changed to a ram position in which the turbine cross-section is clearly reduced. In the section between the cylinders and the exhaust gas turbocharger, a high excess pressure is built up. At the same time, exhaust gas flows at a high flow rate through the ducts between the guide blades and acts upon the turbine wheel, whereby the combustion air supplied to the engine is subjected to excess pressure by the compressor.

As a result, the cylinder is acted upon with increased supercharging pressure on the inlet side. On the outlet side, an excess pressure exists between the cylinder outlet and the exhaust gas turbocharger which counteracts the blowing-off of the air compressed in the cylinder by way of decompression valves into the exhaust gas pipe system. In the engine braking operation, the piston must carry out compression work in the compression and push-out stroke against the high excess pressure in the exhaust gas pipe system, whereby a strong braking effect is achieved.

By way of shut-off bodies, which can be moved into the spaces between the guide blades of the guide baffles, the exhaust gas back pressure between the cylinder outlet and the turbine can be additionally increased in the engine braking operation for increasing the engine braking effect. By way of the shut-off bodies, the effective turbine cross-section is adjusted such that the exhaust gas back pressure required for the desired braking effect is reached in the exhaust gas pipe system.

The shut-off body movement into the spaces between the guide blades is detected by a sensor and analyzed. If faults are recognized in the shut-off body movement, it is attempted to control the effective turbine cross-section only by way of the variable guide baffles without any shut-off bodies. If a fault is also present in the movement of the guide blades of the guide baffles, a fault signal is transmitted to the engine control system and is emitted.

Another method for controlling the supercharging pressure is known from German Patent document DE 195 31 871 C1. In order to permit, by means of simple devices, a control in the transient operation of the internal-combustion engine, particularly after a positive load change from low load and rotational speed ranges, and to improve the efficiency, it is suggested according to this document to determine the difference between the exhaust gas back pressure and the supercharging pressure for the adjustment of the supercharging pressure as the control quantity for the control. As a result, an unacceptably high deviation of the exhaust gas back pressure can be recognized in the case of a positive load change and can be corrected by suitable measures. This control method is used in the fired operation.

From German Patent document DE 27 09 667 C2, an internal-combustion engine with an exhaust gas turbocharger of a conventional construction is known. For monitoring the operating capability of the bypass control in the exhaust gas turbocharger, the supercharging pressure is measured. If the supercharging pressure assumes an unacceptably high value, the inlet collecting pipe of the internal-combustion engine is connected with the atmosphere and the quantity of the fuel to be injected is reduced. Although this makes the turbocharger inoperable, the danger of a component overloading is reduced.

German Patent document DE-OS 23 14 576 discloses a system for detecting faults for an internal-combustion engine. By way of measuring sensors, the load condition, the ambient temperature and the rotational speed of the internal-combustion engine can be determined. When a fault signal occurs in one of the measuring sensors, a monitoring or analysis of structural components or constructional units assigned to the internal-combustion engine can be carried out. However, German Patent document DE-OS 23 14 576 does not discuss the problem of testing the operation of an exhaust gas turbocharger with a variable turbine geometry.

The invention is based on the problem of trying to early diagnose any malfunctioning of exhaust gas turbochargers with a variable turbine geometry.

According to the invention, this problem is solved by the method for operationally testing an exhaust gas turbocharger with a variable turbine geometry for the changeable adjustment of the effective turbine cross-section, in which the actual values of operating quantities influencing the operational capability of the exhaust gas turbocharger are detected which comprise main quantities used for the decision of whether a fault is present in the exhaust gas turbocharger, as well as auxiliary quantities which describe a component of the exhaust gas turbocharger and are used for identifying the fault of this component. In a first step, for the fault detection, a quantity determining the engine air supply is measured as a main quantity. In a second step, at least one auxiliary quantity is measured for the fault identification and, in the event of an unacceptable deviation of the actual auxiliary quantity value from the desired auxiliary quantity value, a fault signal is generated. The position of an adjusting element is measured as an auxiliary quantity, by way of which adjusting element the variable turbine geometry is adjustable.

During the operational testing, two types of operating quantities are determined, which each describe the performance of the exhaust gas turbocharger but which have different functions: Main quantities, which are a measurement of the basic operability of the exhaust gas turbocharger and to which a value is assigned to determine the engine air supply, as well as auxiliary quantities from which a conclusion can be drawn on the operability of a certain component. The auxiliary quantities depend on the construction of the exhaust gas turbocharger. They expediently indicate the position of an adjusting element of the variable turbine geometry.

In a first step of the operational testing of the turbocharger, a main quantity is measured first and is used as a basis for deciding whether there is a malfunctioning. The main quantity forms the decision basis for the fault detection.

If a fault is present, the auxiliary quantity is measured in a second step and is used for the fault identification. The value of the auxiliary quantity is a measurement of the operating capability of the variable turbine geometry. In the event of a fault, the value of the auxiliary quantity is outside the permissible range; the concerned component is inoperable or its operability is limited.

The fault detection by way of the main quantity determining the engine air supply has the advantage that, as a rule, several measuring devices can be used which already exist and which are required for the control in the fired operation and in the engine braking operating, whereby no additional expenditures are caused for the sensor system.

Another advantage is the two-step characteristic of the method for operational testing, whereby the sum of data is reduced which have to be measured and analyzed. The basic decision of whether the exhaust gas turbocharger is inoperable can be made only by the comparison of the measuring data representing the engine air supply with the pertaining desired values. In this stage, it is not absolutely necessary to measure the auxiliary quantities, which supply information on the operating capability of a certain component. The measuring of the auxiliary quantities only becomes necessary if the analysis of the main quantity points to a fault in the exhaust gas turbocharger. The two-step characteristic of the method permits the obtaining of information concerning the operability on the basis of a minimal data base.

By means of the two-step method, the smallest deviations of the charge pressure from the desired value can be recognized and the fault can be assigned to a specific component. A charge pressure which is too low and which negatively influences the braking performance in the engine braking operation and the engine performance in the fired operation, as well as an excessive supercharging pressure, which may lead to an overloading of the exhaust-gas-carrying and supercharging-air-carrying systems, can be recognized on the basis of this method.

All condition quantities and operational quantities of the exhaust gas turbocharger can be used as main quantities which represent a measurement of the engine air supply. This can be detected by a direct measurement by way of the air flow to the engine as well as by an indirect measurement by way of the supercharging pressure, the rotational engine speed and the temperature.

The operational testing can be continuously carried out, specifically in the fired operation as well as in the engine braking operation. In the engine braking operation, the supercharging pressure and the rotational engine speed are preferably taken into account as the main quantities; in the fired operation, the engine load is preferably also taken into account.

In addition, the time from the start of the engine braking operation or of the fired operation is measured in order to take into account dynamic influences on the main quantities and auxiliary quantities and in order to be able to detect the transient performance of the exhaust gas turbocharger.

By way of the determination of the momentary point in time at which a measurement is carried out, dynamic transient effects can be taken into account in the desired-actual comparison between measured values and defined desired values.

As the auxiliary quantity, the position of the adjusting element is detected, which is part of the variable turbine geometry and by way of which the effective turbine cross-section can be adjusted. According to the construction of the used exhaust gas turbocharger, axially displaceable turbine guide baffles can be used as an adjusting element, and the end positions of the guide baffles can be used as the auxiliary quantity, or, guide baffles with rotary blades can be used as the adjusting element and the rotary position of the rotary blades can be used as the auxiliary quantity. As another turbine type, a turbine with a braking flap disposed in front of it can be used, as the auxiliary quantity, the actual position of the braking flap being taken into account.

Optionally, several main quantities and/or auxiliary quantities can be taken into account. The blow-off cross-section of a blow-off or brake valve can be used as additional auxiliary quantities, or parameters which allow conclusions with respect leakages in the supercharging-air guiding / exhaust gas guiding or other damage in the area of the exhaust gas turbocharger.

The operational testing expediently takes place at regular time intervals, whereby the operational reliability is increased and, in addition, information can be obtained concerning the time-related development of the operability of individual components.

Other objects, advantages and novel features of the present invention will become apparent from the following detailed description of the invention when considered in conjunction with the accompanying drawings.

BRIEF DESCRIPTION OF THE DRAWING

The FIGURE shows a flow chart of the method according to the invention for determining the operating capability of an exhaust gas turbocharger.

DETAILED DESCRIPTION OF THE DRAWING

For reasons of clarity, the flow chart in the FIGURE is divided into different blocks 1 to 6. The sequence shown in the diagram is technically implemented in an engine control system and automatic engine control system, including the sensor system required for the measuring.

In block 1, first, the operating mode of the internal-combustion engine is determined. According to the operating mode —drive or fired operation or engine braking operation—a signal is generated which represents the operating mode. The testing with respect to the operational capability can take place for both operating modes in the regular driving operation as well as under test conditions.

In block 2, as a function of the signal representing the operating mode, the actual values of a main quantity or of several main quantities are measured. In each case, a quantity determining the engine air supply is measured as a main quantity. This main quantity, which forms the decision basis for the discovery of the fault, is, as a rule, the supercharging pressure $P_2$ or the air flow. The engine air supply can be detected indirectly by way of the supercharging pressure $P_2$, and the air flow can be detected directly. If the supercharging pressure $P_2$ is measured, for a precise determination of the engine air supply, optionally the temperature and the rotational engine speed can be measured as additional main quantities, and the engine air supply can be determined as a function of the supercharging pressure, the temperature and the rotational engine speed.

The measuring of the supercharging pressure as a quantity which significantly determines the engine air supply, however, is basically sufficient. In this case, it has to be taken into account that, for determining the corresponding desired value, the rotational engine speed must also be taken into account in order to be able to sufficiently precisely determine the actual engine operating point for the desired-actual comparison.

In the fired operation, the engine load is expediently measured and determined as an additional main quantity, which is also included in the determination of the desired value.

It may be advantageous to detect, as an additional main quantity, the time in the form of time increments $\Delta t$ starting from the beginning of a measuring operation. This is done in order to be able to take into account and document dynamic transient effects or other time-related developments and trends, particularly disturbances, in the main quantities and optionally in the auxiliary quantities.

The desired value "desired", which corresponds to the main quantity and which, as a rule, is filed in the engine control system and automatic engine control system in a characteristic diagram or as a function, is used in block 3 for the comparison with the measured actual value "actual". If the amount of the difference between the desired value and the actual value "desired—actual" is smaller than a given tolerance value "tol", no fault exists and the exhaust gas turbocharger is fully operational. In this case, as a rule, a return takes place to block 1, where, at a given time, a new testing cycle is started. Optionally, the actual values can be documented in a block 6.

If the amount of the difference between the desired value and the actual value "desired—actual" is larger than the given tolerance value "tol", a fault exists and the exhaust gas turbocharger is operable only to a limited degree, or is inoperable. In this case, a fault signal is generated and a branching to block 6 takes place in order to indicate the fault signal and document the sequence of the main quantities as well as the fault signal. According to the preceding sign and the quantity of the difference, different fault signals can be generated which may have different consequences. A negative difference "desired—actual" indicates an excessive supercharging pressure which results in an unacceptably high loading of the air-carrying and exhaust-gas-carrying components. An excessive supercharging pressure occurs, for example, when blow-off valves do not function properly.

A positive difference "desired—actual" indicates a supercharging pressure which is too low. This fault may be due to: (1) leakages in the area of the turbine, such as gap losses in the case of variable turbine geometries with displaceable axial baffles which do not reach the required end positions, and (2) an incorrect position of the guide blades when adjustable preguide baffles are used. Other causes may be leakages in the supercharging air and exhaust gas guiding systems.

The precise localizing of the faulty component takes place in blocks 4 and 5.

In the event of a fault—for example, the difference between "desired—actual" is larger than the given tolerance value "tol", auxiliary quantities are first measured which are assigned to a certain assembly or component of the exhaust gas turbocharger for the fault identification in block 4. By measuring the auxiliary quantities and the subsequent analysis in block 5, where the difference "desired—actual" between the given desired values and the measured actual values of the auxiliary quantities is determined and compared with a given tolerance value "tol", the defective component can be identified. Expediently, a plurality of different auxiliary quantities is taken into account, which are each assigned to different components and describe the performance of each component. As the result of a sequential comparison of the different measured auxiliary quantities with the pertaining desired values, the defective component can be localized.

The actual values of the auxiliary quantities can expediently also be indicated and documented in block 6 in order to take immediate measures and determine developments and trends.

By way of the auxiliary quantities, the operation of the adjustable component of the variable turbine geometry, of blow-off valves and brake valves as well as of diverse additional components, can be detected which are assigned directly to the exhaust gas turbocharger or otherwise have influence on the engine air supply, such as devices and pipes for the fuel supply, hydraulic or pneumatic adjusting elements, throttle valves, etc.

After the conclusion of the comparison of the auxiliary quantities, the testing cycle will begin again.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operationally testing an exhaust gas turbocharger having a variable turbine geometry for adjusting an effective turbine cross-section, in which actual values of operating quantities influencing operation of the exhaust gas turbocharger are detected, which values comprise main quantities used for deciding whether a fault is present in the exhaust gas turbocharger, as well as auxiliary quantities describing a component of the exhaust gas turbocharger and used for identifying the fault of the component, the method comprising the acts of:

first measuring a quantity determining an engine air supply as a main quantity in order to detect the fault; and secondly, measuring at least one auxiliary quantity if a fault is detected to identify the fault; and generating a fault signal in an event of an unacceptable deviation of an actually measured auxiliary quantity value from a desired auxiliary quantity value, wherein a position of an adjusting element by which the variable turbine geometry is adjustable is measured as one of said at least one auxiliary quantity.

2. The method according to claim 1, wherein the act of measuring the main quantity measures a supercharging pressure.

3. The method according to claim 1, wherein the act of measuring the main quantity measures an air flow rate.

4. The method according to claim 1, further comprising the act of measuring temperature of the engine air supply as an additional main quantity.

5. The method according to claim 1, further comprising the act of measuring an engine rotational speed as another main quantity.

6. The method according to claim 1, further comprising the act of factoring into account an engine load as another main quantity.

7. The method according to claim 1, wherein a time period starting with a beginning of an engine braking operation or of a fired operation is factored into account as another main quantity.

8. The method according to claim 1, wherein the act of measuring at least one auxiliary quantity measures an end position of axially displaceable turbine guide baffles serving as the adjusting element of the variable turbine geometry.

9. The method according to claim 1, wherein the act of measuring the at least one auxiliary quantity measures a rotating position of rotary blades of guide baffles serving as the adjusting element of the variable turbine geometry.

10. The method according to claim 1, wherein the act of measuring the at least one auxiliary quantity measures an actual position of a braking flap of the variable turbine geometry.

11. The method according to claim 1, wherein the act of measuring the at least one auxiliary quantity factors into account a blow-off cross-section of a blow-off valve as an additional auxiliary quantity.

12. The method according to claim 1, wherein by measuring additional auxiliary quantities, operation of at least one of the following components is detected: an injection pump, an injection nozzle, a fuel supply pump, fuel supply pipes, a compressor wheel, a turbine wheel, a bearing of the exhaust gas turbocharger, a constant throttle valve, and a hydraulic control of the constant throttle valve.

13. The method according to claim 1, wherein operational testing is carried out during a continuous operation of the exhaust gas turbocharger.

14. The method according to claim 13, wherein a supercharging pressure and a rotational engine speed are measured as main quantities in an engine braking operation of the exhaust gas turbocharger.

15. The method according to claim 13, wherein a supercharging pressure, a rotational engine speed, and an engine load are measured as main quantities in a fired operation of the exhaust gas turbocharger.

16. The method according to claim 14, wherein a supercharging pressure, a rotational engine speed, and an engine load are measured as main quantities in a fired operation of the exhaust gas turbocharger.

17. The method according to claim 13, wherein operational testing occurs at regular time intervals.

18. The method according to claim 1, wherein deviations of actually measured values from desired values are electronically documented.

19. The method according to claim 13, wherein deviations of actually measured values from desired values are electronically documented.

* * * * *